United States Patent [19]

Morikawa

[11] Patent Number: 4,940,030
[45] Date of Patent: Jul. 10, 1990

[54] ABNORMALITY DETECTING SYSTEM FOR AN AUTOMOTIVE ENGINE

[75] Inventor: Koji Morikawa, Musashino, Japan

[73] Assignee: Fuji Jukogyo Kabushiki Kaisha, Tokyo, Japan

[21] Appl. No.: 341,145

[22] Filed: Apr. 20, 1989

[30] Foreign Application Priority Data

Apr. 30, 1988 [JP] Japan .......................... 63-059605[U]

[51] Int. Cl.⁵ .............................................. F02B 77/00
[52] U.S. Cl. .............................................. 123/198 D
[58] Field of Search .... 123/198 D, 198 DB, 198 DC, 123/351

[56] References Cited

U.S. PATENT DOCUMENTS 4,574,752  3/1986  Reichert, Jr. et al. ...... 123/198 DB
4,621,600  11/1986  Hasegawa .................... 123/198 DB
4,729,357  3/1988  Freudenschuss et al. ..... 123/198 D
4,811,808  3/1989  Matsumoto et al. ......... 123/198 DB

FOREIGN PATENT DOCUMENTS 60-141442  9/1985  Japan .

*Primary Examiner*—Noah P. Kamen
*Attorney, Agent, or Firm*—Martin A. Farber

[57] ABSTRACT

An accelerator sensor is provided for detecting depression degree of an accelerator pedal of a vehicle, and a torque sensor is provided for detecting output torque of an engine. A memory stores reference torques which are arranged in accordance with depression degree of the accelerator pedal and engine speed. The torque detected by the torque sensor is compared with a reference torque derived from the memory in accordance with the depression degree of the accelerator pedal and engine speed. When the detected torque deviates from a permissible range with respect to the derived reference torque, abnormality is indicated.

3 Claims, 6 Drawing Sheets

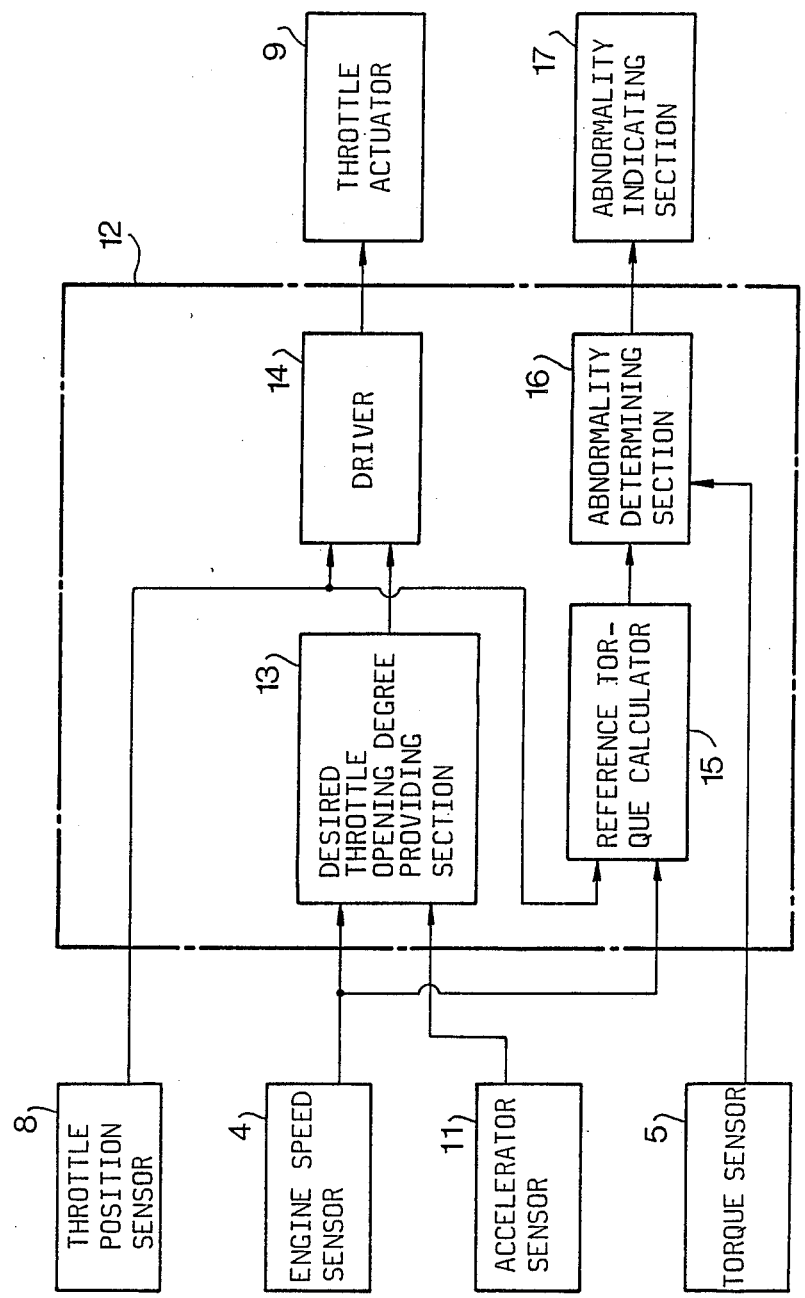

ABNORMALITY DETECTING SYSTEM FOR AN AUTOMOTIVE ENGINE

BACKGROUND OF THE INVENTION

The present invention relates to a system for detecting abnormality for an automotive engine.

Japanese Utility Model Application Laid-Open No. 60-141442 discloses a system for detecting abnormality in an output control system in which a throttle valve of an engine is operated by a stepper motor in accordance with the degree of depression of an accelerator pedal. The system is provided with a control unit for controlling the engine. The control unit is applied with input data such as output torque detected at the transmission of the vehicle, engine speed detected by a speed sensor, an intake-air quantity, and a coolant temperature, and determines whether the engine is normally controlled or not. In this system, the operation of the engine is monitored by the control unit based on the input data. If the output torque does not increase with an increase of the intake air, the engine is deemed abnormal. In the engine, if trouble in the intake system occurs for example by clogging of an intake passage with a foreign substance, the output torque does not increase in spite of a wide open throttle. However, the system does not detect such trouble because the detected output torque corresponds to a small amount of the intake air.

SUMMARY OF THE INVENTION

The object of the present invention is to provide an abnormality detecting system for an automotive engine which reliably detects abnormality based on an opening degree of a throttle valve of the engine or the degree of depression of an accelerator pedal.

According to the present invention, there is provided a system for detecting abnormality of an automotive engine for a motor vehicle having an accelerator pedal for controlling a throttle valve of the engine, comprising an accelerator sensor for detecting depression degree of the accelerator pedal and for producing an accelerator signal, an engine speed sensor for detecting engine speed and for producing an engine speed signal, a torque sensor for detecting output torque of the engine and for producing a torque signal representing the detected torque, storing means storing reference torques arranged in accordance with the depression degree of the accelerator pedal and the engine speed signal, comparator means for comparing the detected torque represented by the torque signal with a reference torque derived from the storing means in accordance with the accelerator signal and the engine speed signal and for producing an abnormality signal when the detected torque deviates from a permissible range with respect to the derived reference torque, and indicator means responsive to the abnormality signal for indicating abnormality.

In an aspect of the invention, the storing means stores the reference torques arranged in accordance with the throttle valve opening degree and the engine speed.

The other objects and features of this invention will become understood from the following description with reference to the accompanying drawings.

BRIEF DESCRIPTION

FIG. 2a is a block diagram of a control unit of the system;

DETAILED DESCRIPTION OF THE PREFERRED EMBODIMENTS

Figure 1:
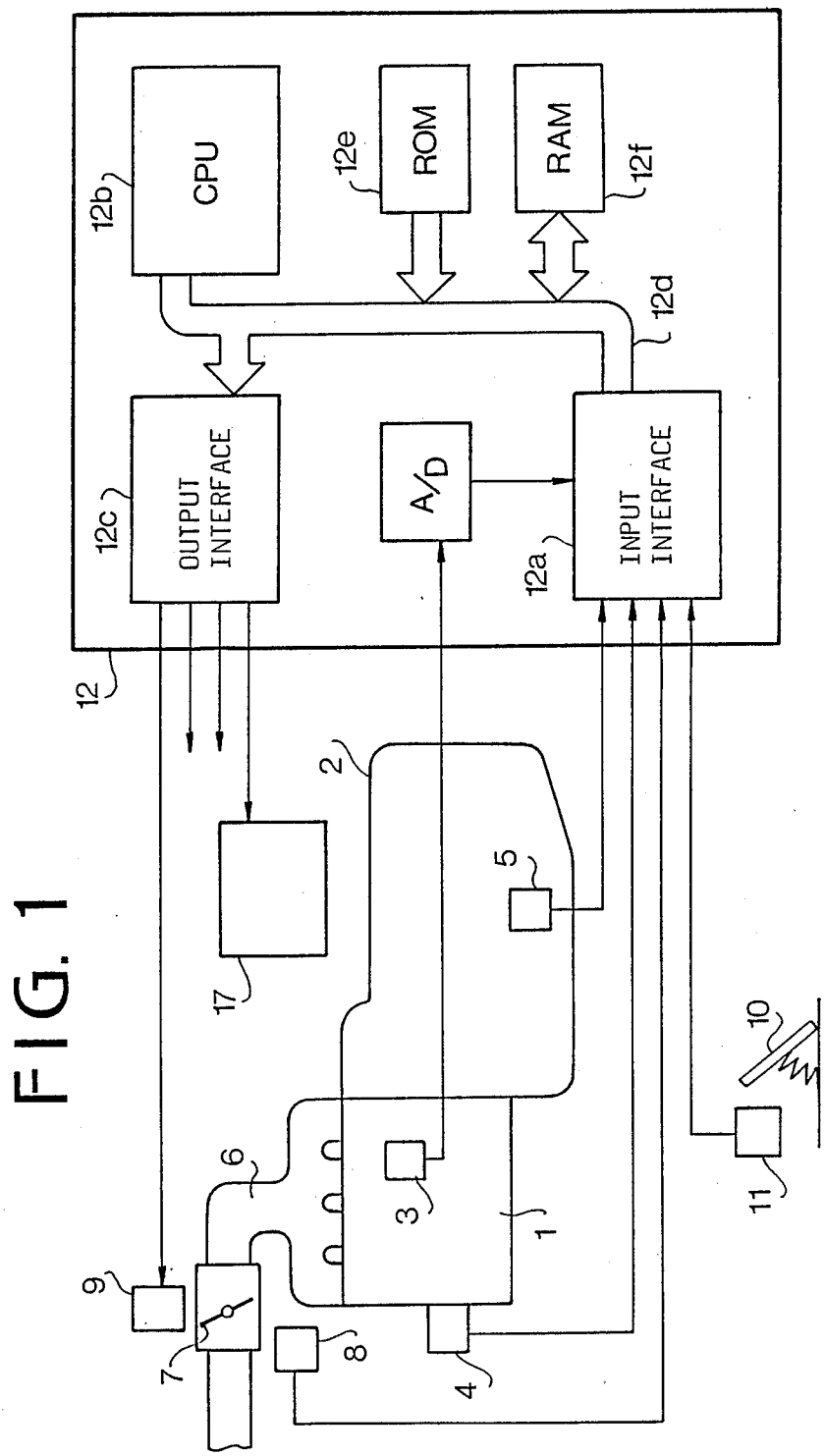
FIG. 1 is a schematic diagram showing a system to which the present invention is applied.

Referring to FIG. 1, an engine 1 for a motor vehicle is provided with a coolant temperature sensor 3 and an engine speed sensor (a crank angle sensor) 4. The power of the engine 1 is transmitted to driving wheels of the vehicle through a transmission 2, on which a torque sensor 5 is provided. An intake passage 6 of the engine 1 has a throttle valve 7 and a throttle position sensor 8 is provided on the throttle valve 7. The throttle valve 7 is operated by a throttle actuator 9 such as a stepper, motor. An accelerator sensor 11 is provided for sensing the depression degree of an accelerator pedal 10.

When the accelerator pedal 10 is depressed, the acceleration sensor 11 produces an accelerator signal which is applied to a control unit 12. Dependent on the signal, the control unit 12 supplies a driving signal to the throttle actuator 9.

The control unit 12 comprises an input interface 12a applied with signals from engine speed sensor 4, torque sensor 5, throttle position sensor 8 and accelerator sensor 11. A signal from the coolant temperature sensor 3 is supplied to the input interface 12a through an A/D converter. A CPU 12b processes these input signals and produces output signals through an output interface 12c. For example, the output signals are applied to the throttle actuator 9 and an abnormality indicating section 17. The input interface 12a, CPU 12b, output interface 12c, ROM 12e, and RAM 12f are connected to each other through a bus line 12d.

Referring to FIG. 2a showing a block diagram of the control unit 12 for detecting abnormality of the control system for the engine, output signals from the engine speed sensor 4 and the accelerator sensor 11 are applied to a desired throttle valve opening degree providing section 13. The desired throttle opening degree providing section 13 derives a desired opening degree of the throttle valve 7 in accordance with these signals from a map stored in the ROM 12e. A driver 14 compares the desired throttle opening degree and an actual throttle opening degree detected from the throttle position sensor 8 and produces an actuating signal for actuating the throttle actuator 9. Thus, the throttle valve is controlled to a desired opening degree.

The coolant temperature from the coolant temperature sensor 3 is supplied to the driver 14 for increasing the accuracy of the control.

Figure 2B:
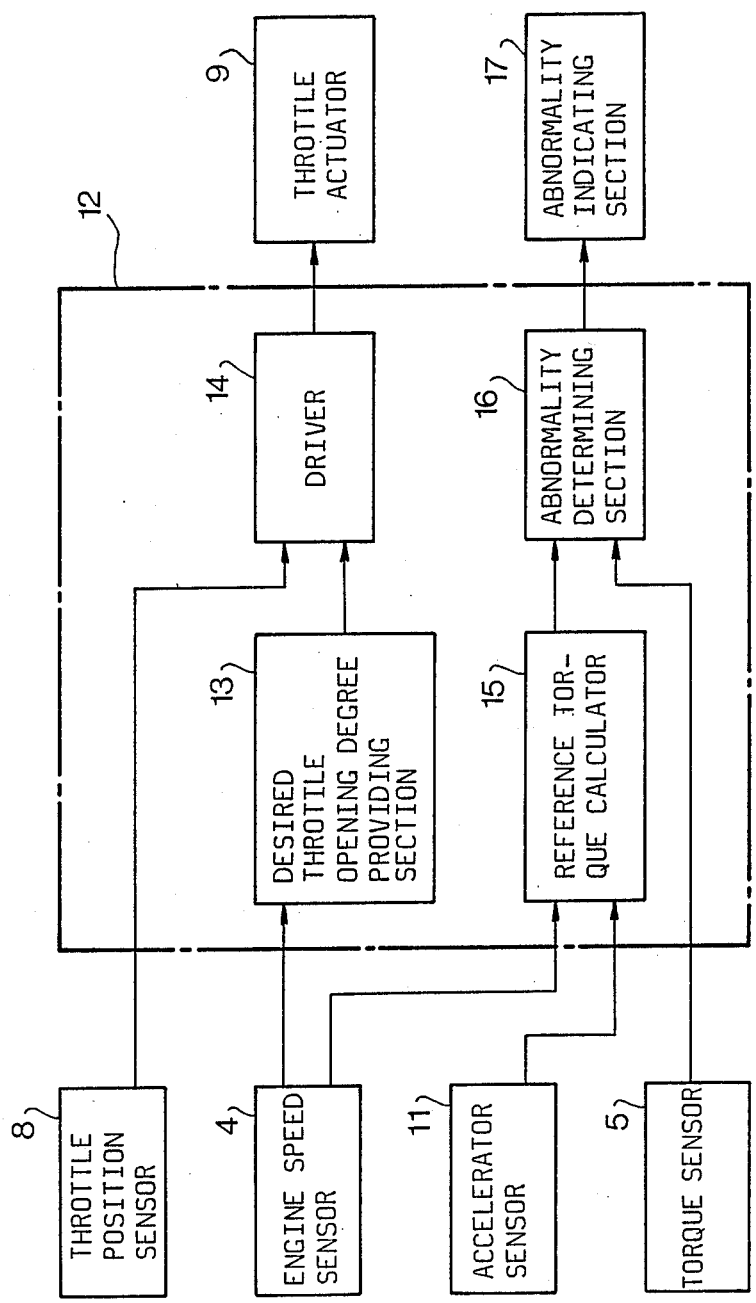
FIG. 2b is another block diagram of the control unit of the system.

Further, the output signal from the throttle position sensor 8 and the engine speed from the engine speed sensor 4 are applied to a reference torque calculator 15 where a reference torque of the engine is calculated with reference to a map stored in the ROM 12e. Another embodiment of the present invention shown in FIG. 2b is that the output signal from the accelerator sensor 11 and the engine speed from the engine speed sensor 4 are supplied to the reference torque caluclator 15 where the reference torque of the engine is calculated with reference to the map stored in the ROM 12e.

A calculated reference torque is applied to an abnormality determining section 16 to which an actual torque signal from the torque sensor 5 is applied. The actual torque is compared with the reference torque. If the actual torque exceeds the reference torque by a predetermined value, the abnormality determining section 16 produces an abnormality signal. The abnormality signal is applied to the abnormality indicating section 17 such as an alarm lamp or a buzzer for indicating the abnormality.

Figure 3:
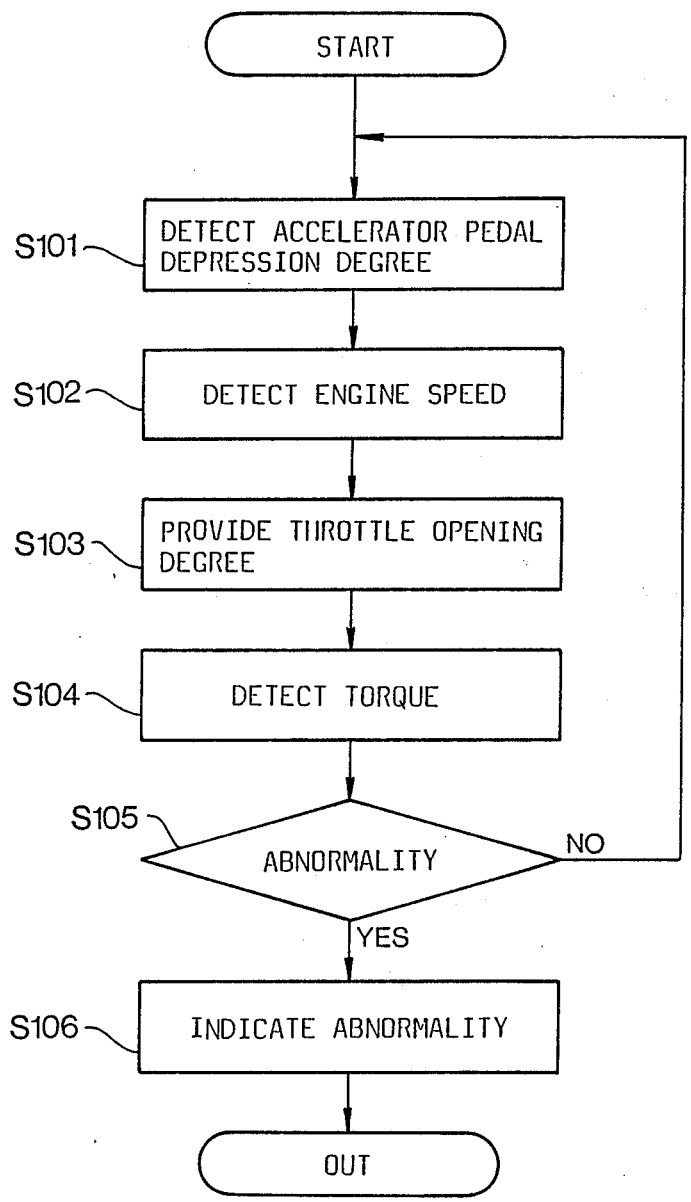
FIG. 3 is a flowchart showing the operation of another embodiment of the present invention.

FIG. 3 shows the flow chart of the present invention.

Figure 4:
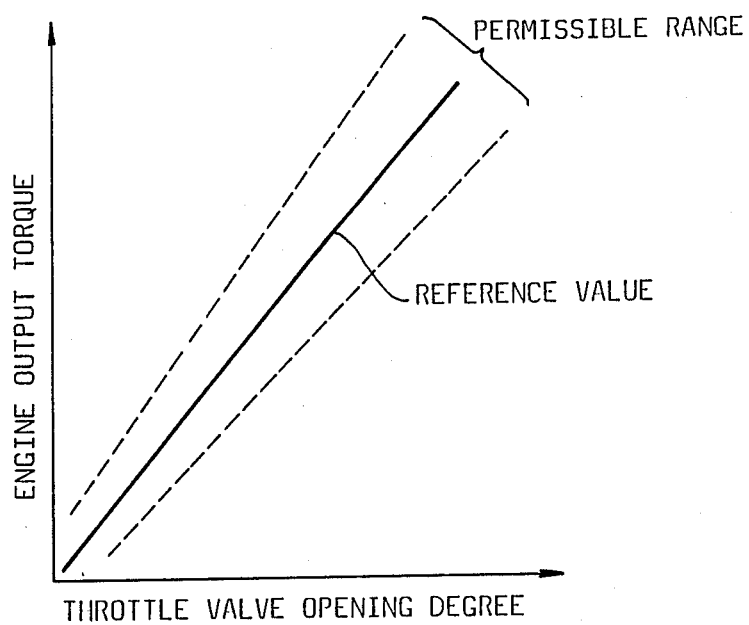
FIG. 4 is a map showing a relationship between output torque of an engine and opening degree of a throttle valve.

At a step S101, the depression degree of the accelerator pedal is provided from the accelerator sensor 11. At a step S102, the engine speed is detected by the engine speed sensor 4. At a step S103, a desired opening degree of the throttle valve 7 is provided in accordance with the detected throttle valve opening degree and engine speed with reference to a map. At a step S104, the actual torque is detected by the torque sensor 5. At a step S105, the actual torque is compared with a reference torque which is derived from a map shown in FIG. 4 in accordance with the detected throttle valve opening degree or the depression degree of the accelerator pedal. If the difference between the reference torque and the actual torque is within a permissible range shown by dotted lines in FIG. 4, abnormality is not determined. The program returns to step S101. If the difference deviates from the permissible range, the engine is deemed abnormal and the abnormality is indicated at a step S106.

Although, the reference torque is obtained in accordance with the detected throttle opening degree and the engine speed in the above-described system, the depression degree of the accelerator pedal and the engine speed is used for determining the reference torque. In this case, if the throttle valve 7 is controlled by a drive-by-wire system, either abnormality in the throttle valve or in the accelerator pedal 10 is detected.

Figure 5:
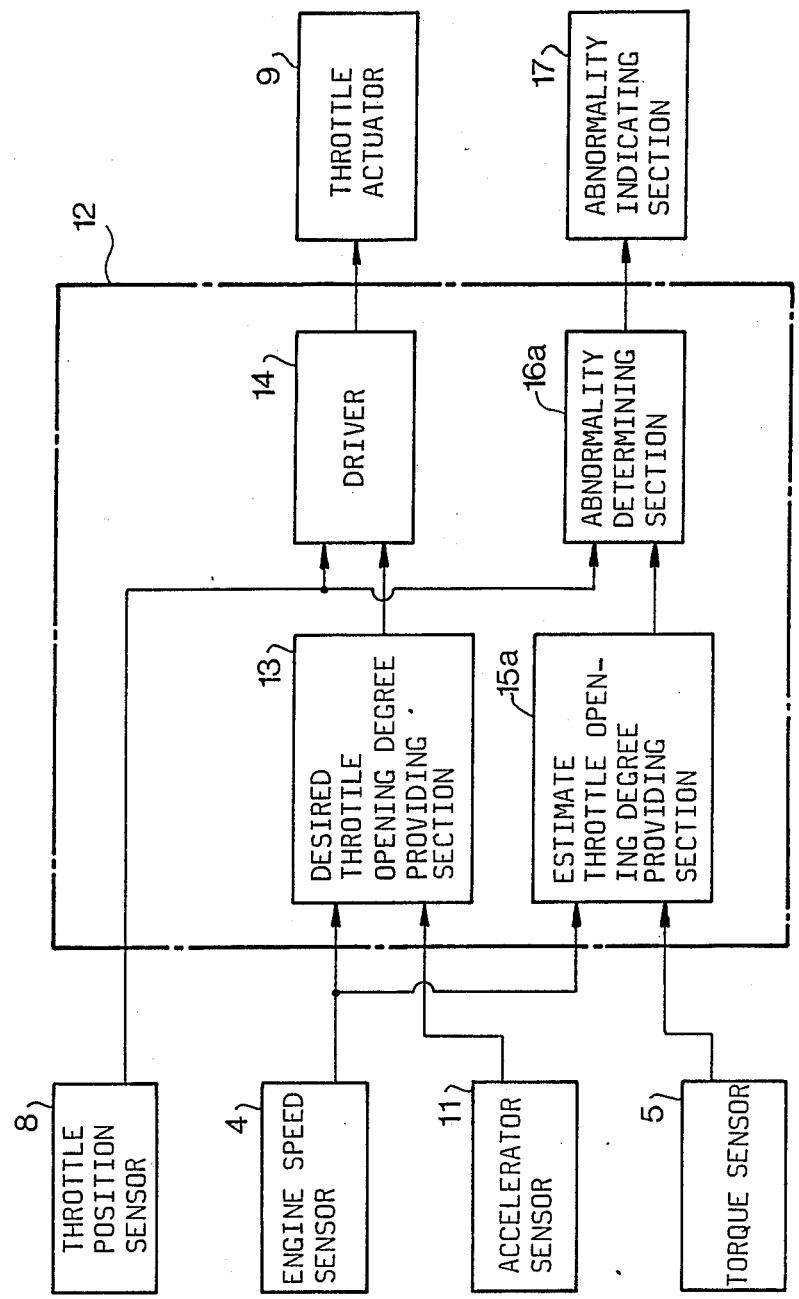
FIG. 5 is a block diagram showing another embodiment of the control unit.

FIG. 5 shows a modification of the control unit 12. An estimated throttle valve opening degree providing section 15a is provided for estimating the throttle valve opening degree in accordance with a map dependent on the engine speed from the sensor 4 and the actual torque from the torque sensor 5. The estimated throttle opening degree is compared with the actual throttle opening degree from the sensor 8 at an abnormality determining section 16a. If the difference between both degrees is outside a permissible range, abnormality is determined.

In accordance with the present invention, abnormality is detected with respect to the throttle valve opening degree and the depression degree of the accelerator pedal. When the output torque of the engine deviates from a reference value, abnormality of the system is determined. Thus, abnormality is reliably detected.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for detecting abnormality of an automotive engine for a motor vehicle having an accelerator pedal for controlling a throttle valve of the engine, comprising:

an accelerator sensor for detecting a depression degree of the accelerator pedal and for producing an accelerator signal;

an engine speed sensor for detecting an engine speed and for producing an engine speed signal;

a torque sensor for detecting output torque of the engine and for producing a torque signal representing the detected torque;

storing means for storing reference torques arranged in accordance with the depression degree of the accelerator pedal and the engine speed;

comparator means for comparing the detected torque represented by the torque signal with a reference torque derived from the storing means in accordance with the accelerator and the engine speed signals and for producing an abnormality signal when the detected torque deviates from a permissible range with respect to the derived reference torque; and indicator means responsive to the abnormality signal for indicating an abnormality.

2. A system for detecting abnormality of an automotive engine for a motor vehicle having an accelerator pedal for controlling a throttle valve of the engine, comprising:

a throttle position sensor for detecting a throttle valve opening degree and for producing a throttle position signal;

an engine speed sensor for detecting an engine speed and for producing an engine speed signal;

a torque sensor for detecting output torque of the engine and for producing a torque signal representing the detected torque;

storing means for storing reference torques arranged in accordance with the throttle valve opening degree and the engine speed;

comparator means for comparing the detected torque represented by the torque signal with a reference torque derived from the storing means in accordance with the throttle position and the engine speed signals and for producing an abnormality signal when the detected torque deviates from a permissible range with respect to the derived reference torque; and indicator means responsive to the abnormality signal for indicating an abnormality.

3. A system for detecting abnormality of an automotive engine for a motor vehicle having an accelerator pedal for controlling a throttle valve of the engine, comprising:

a throttle position sensor for detecting a throttle valve opening degree and for producing a throttle position signal;

an engine speed sensor for detecting an engine speed and for producing an engine speed signal;

a torque sensor for detecting output torque of the engine and for producing a torque signal representing the detected torque;

storing means for storing reference throttle valve opening degrees arranged in accordance with the output torque of the engine and the engine speed;

comparator means for comparing the detected opening degree represented by the throttle position signal with a reference throttle valve opening degree derived from the storing means in accordance with the torque and the engine speed signals and for producing an abnormality signal when the detected opening degree deviates from a permissible range with respect to the derived reference throttle valve opening degree; and indicator means responsive to the abnormality signal for indicating an abnormality.

* * * * *